(12) United States Patent
Shin et al.

(10) Patent No.: US 12,197,119 B2
(45) Date of Patent: Jan. 14, 2025

(54) APERTURE MODULE AND CAMERA MODULE INCLUDING THE SAME

(71) Applicant: SAMSUNG ELECTRO-MECHANICS CO., LTD., Suwon-si (KR)

(72) Inventors: Jun Sup Shin, Suwon-si (KR); Chuel Jin Park, Suwon-si (KR); Bo Sung Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 106 days.

(21) Appl. No.: 18/295,503

(22) Filed: Apr. 4, 2023

(65) Prior Publication Data

US 2024/0126139 A1 Apr. 18, 2024

(30) Foreign Application Priority Data

Oct. 17, 2022 (KR) .......................... 10-2022-0133455

(51) Int. Cl.
| | |
|---|---|
| *G03B 9/22* | (2021.01) |
| *G03B 3/10* | (2021.01) |
| *G03B 5/00* | (2021.01) |
| *G03B 17/12* | (2021.01) |
| *G03B 30/00* | (2021.01) |

(52) U.S. Cl.
CPC ............... *G03B 9/22* (2013.01); *G03B 3/10* (2013.01); *G03B 5/00* (2013.01); *G03B 17/12* (2013.01); *G03B 30/00* (2021.01); *G03B 2205/0007* (2013.01); *G03B 2205/0069* (2013.01)

(58) Field of Classification Search
None
See application file for complete search history.

(56) References Cited

U.S. PATENT DOCUMENTS

| | | | |
|---|---|---|---|
| 2020/0301246 A1 | 9/2020 | Seo et al. | |
| 2020/0401014 A1 | 12/2020 | Seo et al. | |
| 2023/0273504 A1* | 8/2023 | Chen | G03B 9/06 396/510 |

FOREIGN PATENT DOCUMENTS

| | | | | |
|---|---|---|---|---|
| CN | 109791266 A | * | 5/2019 | ........... G02B 27/646 |
| JP | 2021-21846 A | | 2/2021 | |
| KR | 10-2020-0107457 A | | 9/2020 | |
| KR | 10-2020-0144259 A | | 12/2020 | |
| KR | 10-2297281 B1 | | 9/2021 | |
| KR | 10-2313877 B1 | | 10/2021 | |

OTHER PUBLICATIONS

Korean Office Action issued on Nov. 4, 2024, in counterpart Korean Patent Application No. 10-2022-0133455 (8 pages in English, 6 pages in Korean).

* cited by examiner

*Primary Examiner* — Rodney E Fuller
(74) *Attorney, Agent, or Firm* — NSIP Law

(57) ABSTRACT

An aperture module is provided. The aperture module includes a plurality of blades configured to interlock with each other to form a through-hole, a rotator on which the plurality of blades are disposed, a first base on which the rotator is disposed, a second base connected to the first base, and a driving unit disposed on the second base and configured to provide a driving force to move the rotator in a direction that intersects an optical axis direction. The first base is configured to move in an optical axis direction with respect to the second base.

20 Claims, 12 Drawing Sheets

APERTURE MODULE AND CAMERA MODULE INCLUDING THE SAME

CROSS-REFERENCE TO RELATED APPLICATIONS

This application claims the benefit under 35 USC § 119(a) of Korean Patent Application No. 10-2022-0133455, filed on Oct. 17, 2022, in the Korean Intellectual Property Office, the entire disclosure of which is incorporated herein by reference for all purposes.

BACKGROUND

1. Field

The following description relates to an aperture module and a camera module including the same.

2. Description of Related Art

Portable electronic devices may include a camera module. For example, portable electronic devices such as, but not limited to, mobile phones, notebooks, and the like, may include one or more camera modules. As photographing and video recording using portable electronic devices become common, high-performance camera modules are desired.

However, the high performance of the camera module may result in the camera module having a large size, which may hinder the portable electronic device having a thin form factor. For example, a high-performance camera module may protrude outside of the surface of a portable phone or may restrict the design freedom of the portable phone.

The importance of an aperture module to adjust the amount of light incident on a lens module and an image sensor is increasing in order to improve imaging quality. To accurately control an amount of incident light, an operation that may accurately implement the entrance hole of the aperture module in various sizes may be desired.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, an aperture module includes a plurality of blades configured to interlock with each other to form a through-hole; a rotator on which the plurality of blades are disposed; a first base on which the rotator is disposed; a second base connected to the first base; and a driving unit disposed on the second base, and configured to provide a driving force to move the rotator in a direction that intersects an optical axis direction, wherein the first base is configured to move in the optical axis direction with respect to the second base.

The aperture module may further include an elastic member disposed between the first base and the second base, and configured to have a length in the optical axis direction.

The aperture module may further include a lens barrel configured to accommodate a plurality of lenses, and a lens holder configured to accommodate the lens barrel, wherein the second base is fixed to the lens holder.

The plurality of blades may include a first blade that is fixed to the first base; and a second blade and a third blade that are rotatably disposed with respect to the first base, and are configured to change a size of the through-hole.

The plurality of blades may be driven based on an operation of a drive shaft that is disposed on the first base.

The rotator may include a plurality of first protrusions which each have a length in the optical axis direction, the plurality of blades include a receiving hole in which the plurality of first protrusions are accommodated, and the plurality of first protrusions are configured to move in the receiving hole of the plurality of blades.

The driving unit may include a magnet holder in which a magnet is disposed, the magnet holder may include a plurality of second protrusions having a length in the optical axis direction, the rotator may include a plurality of third protrusions that are configured to engage with the plurality of second protrusions, and the plurality of second protrusions and the plurality of third protrusions may be configured to move together in a direction that intersects the optical axis direction.

A first surface of the first base may include a protrusion that protrudes in a direction that intersects the optical axis.

When the first base moves in the optical axis direction, the first base may be configured to slide with respect to the second base, and a guide groove may be disposed in one of a contact surface of the first base and a contact surface of the second base, and a guide protrusion my be disposed in another of the contact surface of the first base and the contact surface of the second base.

The aperture module may include a plurality of ball members disposed between the driving unit and the second base; and a plurality of ball guide portions configured to accommodate the plurality of ball members, wherein the plurality of ball members are configured to roll in a direction that intersects the optical axis direction.

In a general aspect a camera module includes a lens module including a plurality of lenses; an aperture module disposed above the lens module; and a housing configured to accommodate the lens module, wherein the lens module includes a lens barrel configured to accommodate a plurality of lenses, and a lens holder configured to accommodate the lens barrel, and wherein the aperture module includes: a first base to which the lens module is coupled; a plurality of blades disposed above the lens module, and configured to selectively form one of a plurality of holes having different diameters; a rotator on which the plurality of blades are disposed, and coupled to the first base, and configured to move with respect to the first base; a second base connected to the first base; and a driving unit disposed on the second base, and configured to provide a driving force to move the rotator in a direction that intersects an optical axis direction, and wherein the first base is configured to move in an optical axis direction with respect to the driving unit.

The camera module may include a coil disposed in the housing; and a connection board configured to supply power to the coil.

The lens may include a first lens holder configured to surround the lens barrel; a second lens holder configured to surround the first lens holder; and a third lens holder configured to surround the second lens holder, and a plurality of elastic members disposed between the lens barrel and the first lens holder.

The camera module may include a shake correction unit disposed in the first lens holder, and configured to move the lens barrel in a direction that intersects the optical axis, with respect to the third lens holder.

The shake correction unit may include a first magnet and a second magnet disposed on the first lens holder; and a first coil which faces the first magnet and a second coil which faces the second magnet, wherein a direction of a driving force by the first magnet and the first coil, and a direction of a driving force by the second magnet and the second coil are perpendicular to each other.

The camera module may include a focus adjustment unit disposed on the third lens holder, and configured to move the lens holder in the optical axis direction with respect to the housing.

The focus adjustment unit may include a third magnet disposed on the third lens holder and a third coil disposed in the housing to face the third magnet.

In a general aspect, a camera module includes an aperture module, including a first base; a plurality of blades, disposed on the first base, and configured to form a through-hole in an optical axis direction; a rotator, disposed on the base; and configured to connect the plurality of blades, and configured to control a rotational motion of the plurality of blades; and a second base, connected to the first base, and configured to guide a movement of the first base in the optical axis direction in response to at least one of a pop-in state and a pop-out state of the camera module.

The first base may be configured to more in the optical axis direction relative to the second base.

The pop-in state may include a state in which power is off, and the pop-out state may include a state in which power is on.

Other features and aspects will be apparent from the following detailed description, the drawings, and the claims.

Figure 1:
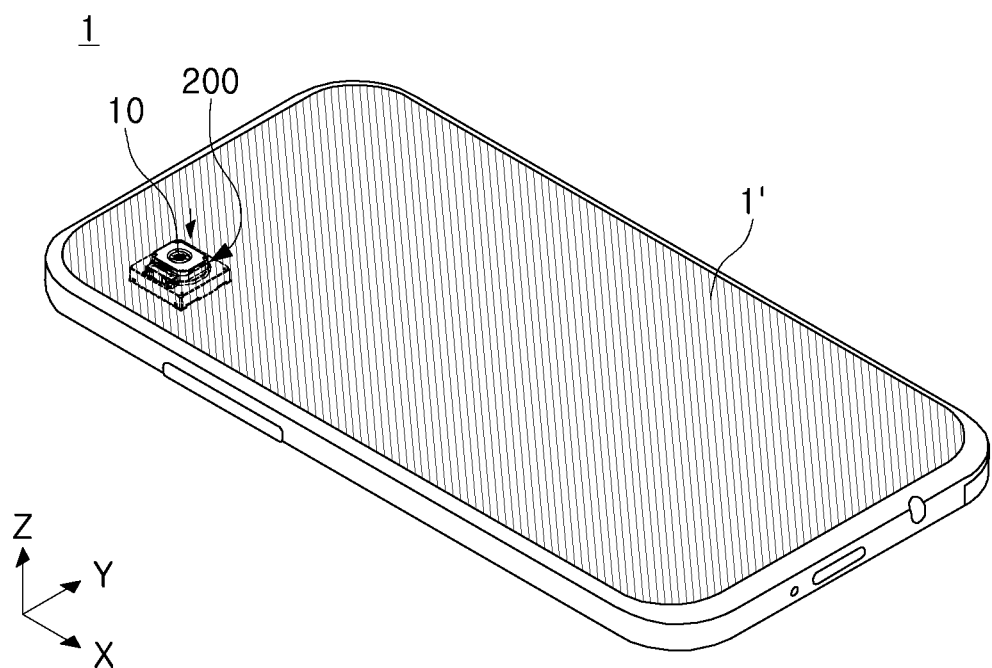
FIG. 1 is a perspective view of an example electronic device including a camera module in a pop-in state, in accordance with one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

One or more examples provide an aperture module and a camera module including the aperture module, in which a degree of protrusion of the aperture module may be adjusted depending on whether the camera module is used or not.

In an example, an aperture module 100 and a camera module 10 including the same are provided, and may be provided in a portable electronic device 1 such as, but not limited to, a mobile communication terminal, a smartphone, and a tablet personal computer (PC).

Figure 2:
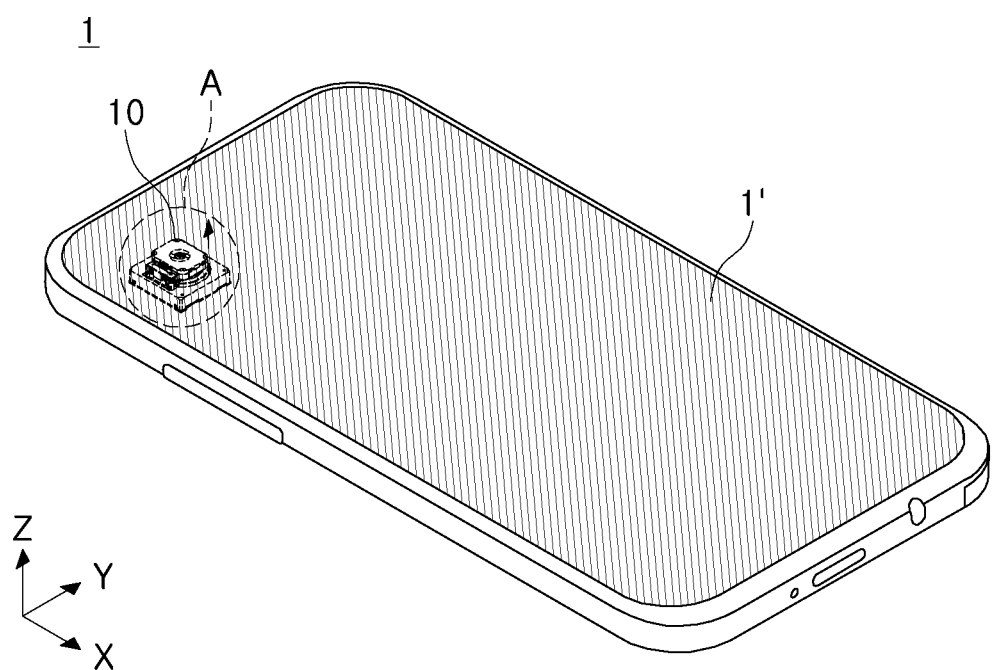
FIG. 2 is a perspective view of an example electronic device including a camera module in a pop-out state, in accordance with one or more embodiments.
Figure 3:
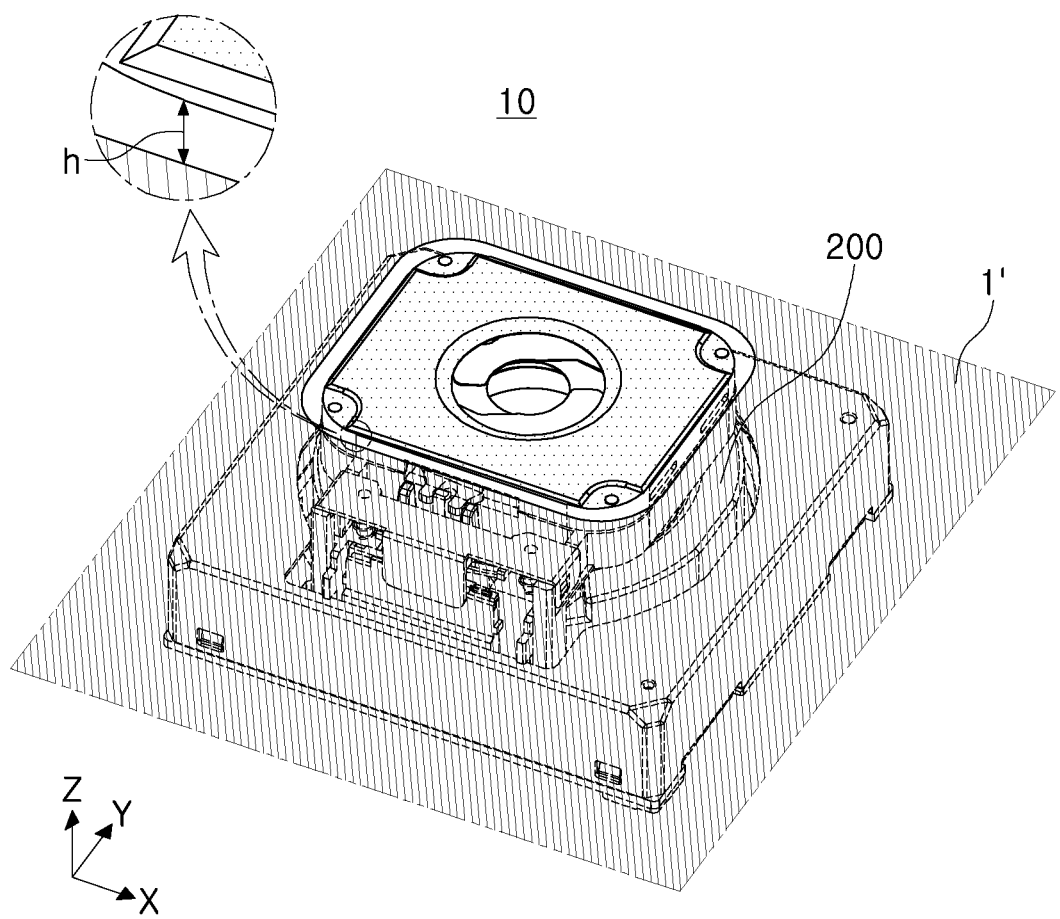
FIG. 3 is an enlarged view of portion A of FIG. 2.

FIG. 1 is a perspective view of an example electronic device 1 including the camera module 10 in a pop-in state, in accordance with one or more embodiments. FIG. 2 is a perspective view of the example electronic device 1 including the camera module 10 in a pop-out state, in accordance with one or more embodiments, and FIG. 3 is an enlarged view of portion A of FIG. 2.

In the example camera module 10, the height of a lens module 200 changes depending on whether it is operated or not. Accordingly, when the lens module 200 is in a power-off state, it may be disposed in a position lower than a position of the lens module 200 when it is in a power-on state. In an example, the lens module may be inserted into the electronic device 1 in a pop-in state, and then, in a pop-out state, the lens module 200 may protrude out of the electronic device 1. In an example, a driving unit (not illustrated), that changes the height of the lens module 200, may be provided outside the camera module 10. However, this is only an example, and, in an example, the drive unit may be disposed in the camera module 10. In an example, the driving unit (not illustrated) may have a form including a mechanical cam unit within the range of allowing the lens module 200 to be carried or driven in and out of the electronic device 1. By varying the height of the lens module 200 based on an operation of the driving unit (not illustrated), a sufficient movement distance of the lens in the optical axis (Z-axis) direction, to perform autofocus (AF) driving, may be secured, and the camera module 10 may be prevented from protruding excessively outwardly of the electronic device 1. The driving unit (not illustrated) may be disposed in the electronic device 1.

Referring to FIG. 1, the camera module 10, in an initial state in which power is not turned on, is in a pop-in state, and a portion of the lens module 200 may be exposed outside a hatched outer surface 1' of the electronic device 1. The remaining portion of the lens module 200 may be accommodated inside the electronic device 1 and may not be exposed to the outside of the electronic device 1. FIG. 2 illustrates a state in which the power of the camera module 10 is turned on, and the camera module 10 is in popped out state.

Referring to FIG. 2, the lens module 200 protrudes in the direction of the optical axis (Z-axis), such that the lens module 200 protrudes out of the hatched outer surface 1' of the electronic device 1. In an example, FIG. 3 illustrates a state in which the lens module 200 protrudes outwardly of the hatched outer surface 1' of the electronic device 1 by a height h. For reference, FIG. 3 illustrates a state in which the aperture module 100 is disposed on the lens module 200.

Figure 4:
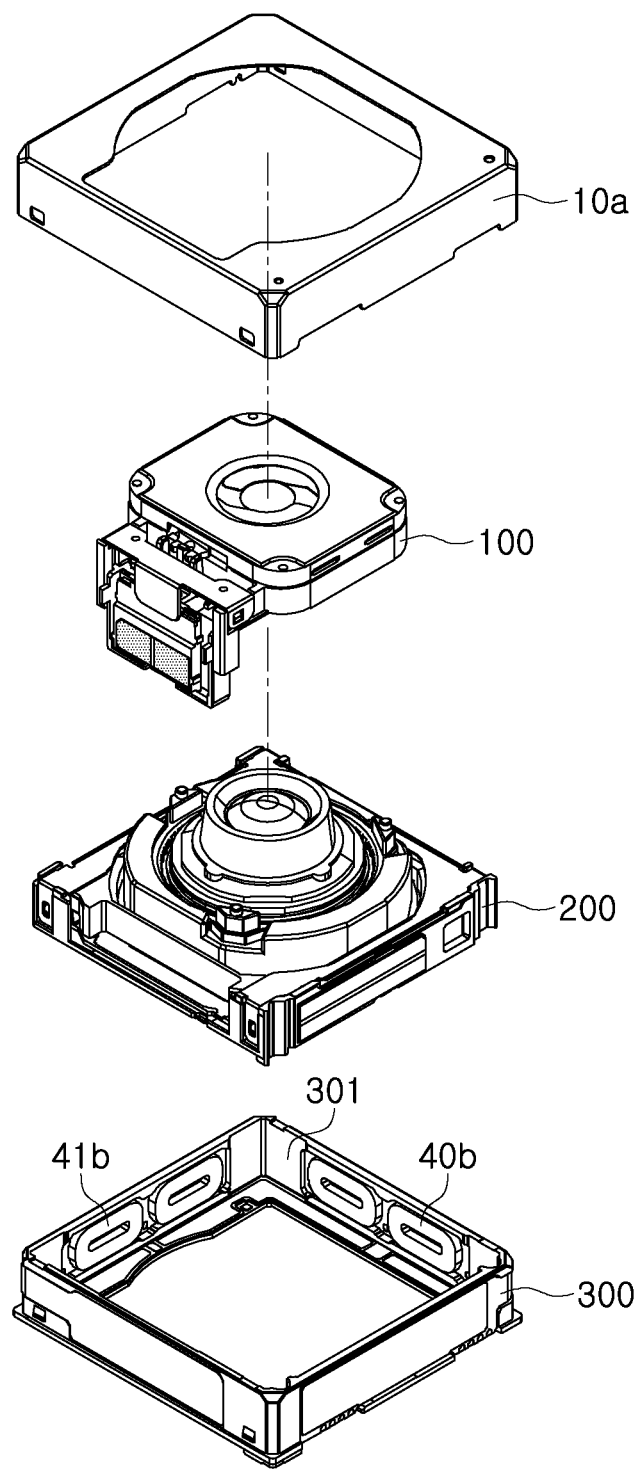
FIG. 4 is a partially exploded perspective view in which an example camera module, in accordance with one or more embodiments, is disassembled into a cover, an aperture module, a lens module, and a housing.
Figure 5:
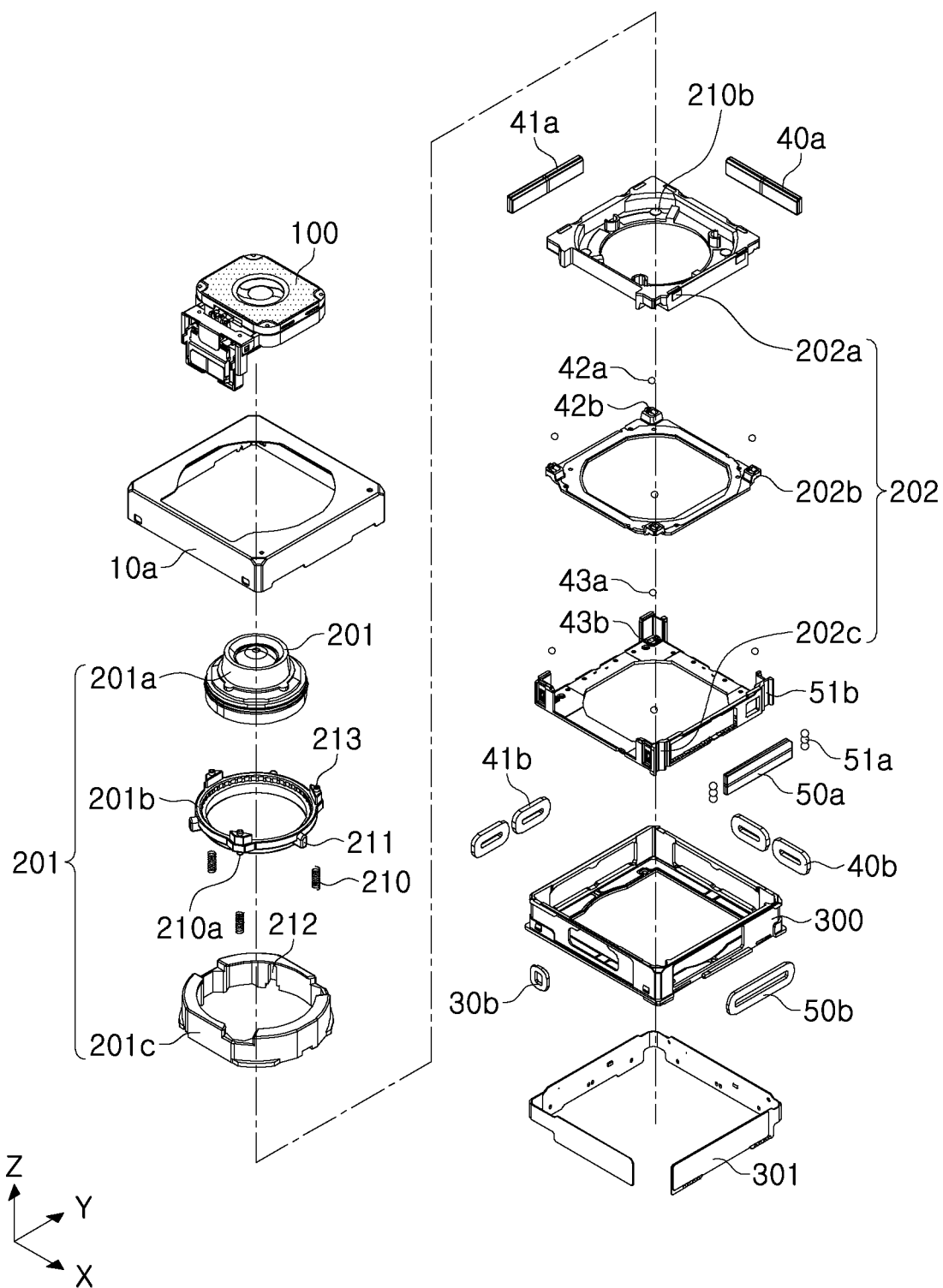
FIG. 5 is a schematic exploded perspective view of an example camera module, in accordance with one or more embodiments.

FIG. 4 is a partially exploded perspective view in which the example camera module 10, in accordance with one or more embodiments, is disassembled into a cover 10a, the aperture module 100, the lens module 200, and a housing 300, and FIG. 5 is a schematic exploded perspective view of the example camera module 10, in accordance with one or more embodiments.

The camera module 10, in accordance with one or more embodiments, includes the aperture module 100, the lens module 200 and the housing 300. The aperture module 100 may be disposed above the lens module 200, and the lens module 200 may be accommodated in the housing 300. A connection board 301 that supplies power to coils 40b, 41b and 50b may be disposed on an inner surface of the housing 300. In an example, the connection board 301 may be formed of a flexible printed circuit board (FPCB). The cover 10a may be formed to surround the aperture module 100, the lens module 200 and the housing 300. The cover 10a may be open in the optical axis (Z-axis) direction such that the aperture module 100 and the lens module 200 may move in the optical axis (Z-axis) direction.

Referring to FIG. 5, the lens module 200 includes a lens barrel 201 that accommodates a plurality of lenses, and a lens holder 202 that accommodates the lens barrel 201.

A plurality of lenses that capture an image of a subject may be accommodated in the lens barrel 201, and, in an example, the plurality of lenses may be mounted in the lens barrel 201 along the optical axis (Z-axis).

The lens barrel 201 may include a lens barrel 201a that accommodates a plurality of lenses, a guide member 201b that surrounds the lens barrel 201a and guides the movement of the lens barrel 201, and a lens barrel holder 201c. The first lens barrel holder 201c may surround the lens barrel 201a and the guide member 201b, and a portion of the first lens barrel holder 201c may be accommodated in a first lens holder 202a to be described later.

The lens holder 202 may include a first lens holder 202a that surrounds the lens barrel 201, a second lens holder 202b that surrounds the first lens holder 202a, and a third lens holder 202c that surrounds the second lens holder 202b.

The first lens holder 202a may be formed of a curved surface and a flat surface to surround the cylindrical lens barrel 201. The second lens holder 202b may be formed to surround a portion of a lower end of the first lens holder 202a. The third lens holder 202c may be disposed on the lower end of the second lens holder 202b to surround a portion of an outer side of the second lens holder 202b. For example, a protruding portion of the third lens holder 202c in the direction of the optical axis (Z-axis) may surround a portion of the outer side of the second lens holder 202b.

The lens module 200, in accordance with one or more embodiments, may include a shake correction unit 40 (40a, 41a, 40b, 41b) that relatively moves a plurality of lenses with respect to the lens holder 202 in a direction intersecting, or perpendicular to, the optical axis (Z-axis), and a focus adjustment unit 50 (50a 50b) that relatively moves the plurality of lenses with respect to the housing 300 in the direction of, or parallel to, the optical axis (Z-axis).

The shake correction unit 40 may include a first magnet 40a, a second magnet 41a, a first coil 40b, and a second coil 41b. The first magnet 40a may be disposed on one outer surface of the first lens holder 202a, and the second magnet 41a may be disposed on an outer surface of the first lens holder 202a, adjacent to the outer surface where the first magnet 40a is disposed. The first coil 40b may be disposed on one side of the housing 300 to face the first magnet 40a, and the second coil 41b may be disposed on the other side of the housing 300 to face the second magnet 41a. The direction of the driving force by the first magnet 40a and the first coil 40b and the direction of the driving force by the second magnet 41a and the second coil 41b may be perpendicular to each other.

The first magnet 40a and the first coil 40b may be configured to move the lens barrel 201, the first lens holder 202a, and the second lens holder 202b with respect to the third lens holder 202c in the Y-axis direction. For example, a plurality of third ball members 43a may be disposed between the second lens holder 202b and the third lens holder 202c, and a plurality of third ball guide grooves 43b may be disposed in the surface of the second lens holder 202b facing the third lens holder 202c and the surface of the third lens holder 202c facing the second lens holder 202b. The plurality of third ball members 43a may be accommodated in the plurality of third ball guide grooves 43b to guide the movement of the second lens holder 202b in the Y-axis direction with respect to the third lens holder 202c. Therefore, the lens barrel 201, in which a plurality of lenses are accommodated, the first lens holder 202a and the second lens holder 202b that accommodates the lens barrel 201, may move relative to the third lens holder 202c in the Y-axis direction together, thereby performing an image stabilization operation in the Y-axis direction.

The second magnet 41a and the second coil 41b may enable the lens barrel 201 and the first lens holder 202a to move relative to the second lens holder 202b and the third lens holder 202c in the X-axis direction. For example, a plurality of second ball members 42a may be disposed between the first lens holder 202a and the second lens holder 202b, and a plurality of second ball guide grooves 42b may be disposed in the surface of the first lens holder 202a facing the second lens holder 202b and the surface of the second lens holder 202b facing the first lens holder 202a. The plurality of second ball members 42a may be accommodated in the plurality of second ball guide grooves 42b, thereby guiding movement of the first lens holder 202a in the X-axis direction with respect to the second lens holder 202b. Therefore, the lens barrel 201, that accommodates a plurality of lenses, and the first lens holder 202a that accommodates the lens barrel 201 may be relatively moved together in the X-axis direction with respect to the second lens holder 202b and the third lens holder 202c, thereby performing an image stabilization operation in the X-axis direction.

The focus adjustment unit 50 (50a 50b) may move the lens holder 202 which accommodates the lens barrel 201 relatively in the optical axis (Z-axis) direction with respect to the housing 300. The focus adjustment unit 50 may include a third magnet 50a and a third coil 50b. The third magnet 50a may be disposed on one outer surface of the third lens holder 202c. In this example, one outer surface of the third lens holder 202c on which the third magnet 50a is disposed may be parallel to one outer surface among the outer surfaces of the second lens holder 202b on which the first magnet 40a and the second magnet 41a are disposed, and may be perpendicular to any other outer surface. For example, the outer surface of the second lens holder 202b on which the third magnet 50a is disposed may be perpendicular to the surface on which the first magnet 40a is disposed, and may be disposed parallel to the surface on which the second magnet 41a is disposed.

The third magnet 50a and the third coil 50b may enable the lens barrel 201 which accommodates a plurality of lenses and the lens holder 202 which accommodates the lens barrel 201 to be moved relative to the housing 300 in the optical axis (Z-axis) direction. For example, a plurality of fourth ball members 51a may be disposed between the third lens holder 202c and the housing 300, and a fourth ball guide groove 51b may be disposed between one surface of the outer side on which the third magnet 50a and the third coil 50b of the third lens holder 202c are disposed and one surface of the housing 300 opposite thereto. The plurality of fourth ball members 51a may be accommodated in the plurality of fourth ball guide grooves 51b, and may guide a movement of the lens holder 202 in the optical axis (Z-axis) direction with respect to the housing 300.

Figure 6:
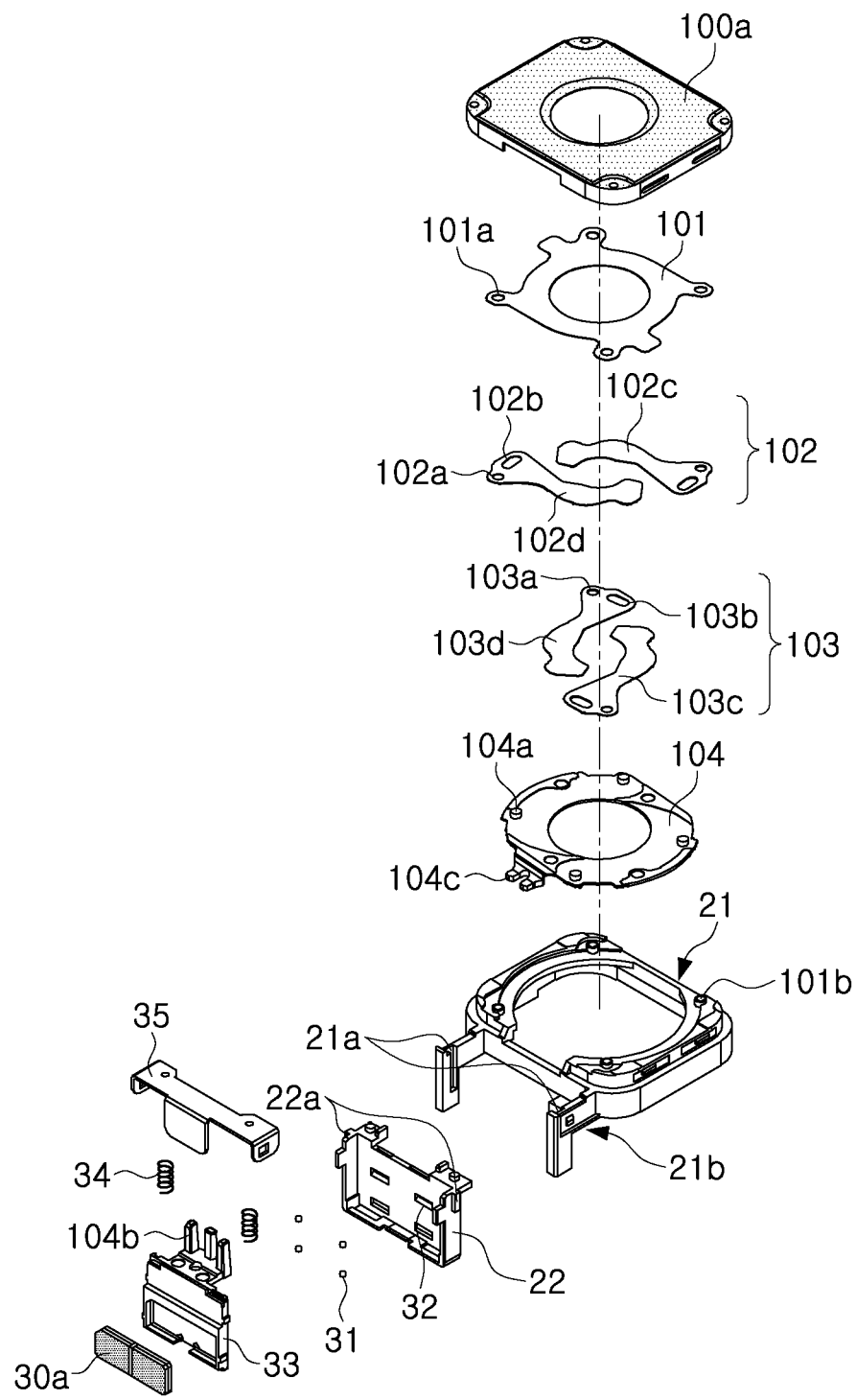
FIG. 6 is an exploded perspective view of an aperture module, in accordance with one or more embodiments.
Figure 7:
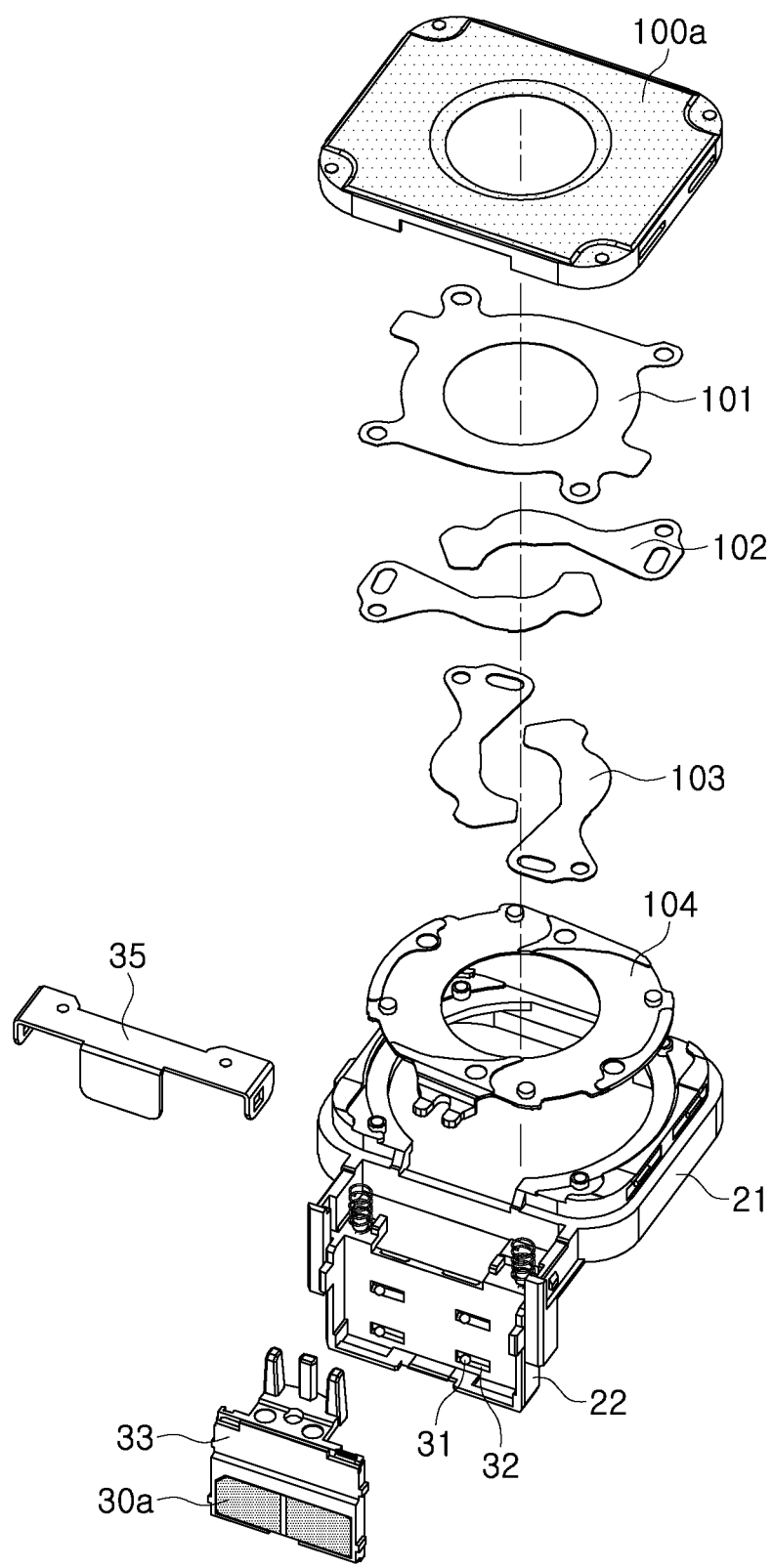
FIG. 7 is an exploded perspective view of an aperture module in a state in which a first base and a second base are coupled, in accordance with one or more embodiments.

FIG. 6 is an exploded perspective view of the aperture module 100, in accordance with one or more embodiments, and FIG. 7 is an exploded perspective view of the aperture module 100 in a state in which a first base 21 and a second base 22 are coupled, in accordance with one or more embodiments.

Hereinafter, the aperture module 100, in accordance with one or more embodiments, will be described with reference to FIGS. 6 and 7.

The aperture module 100 includes a first base 21 on which a plurality of blades 101, 102 and 103 which interlockingly form a hole or opening are disposed, a second base 22 connected to the first base 21, an aperture driver (a magnet 30a and a fourth coil 30b), and a rotator 104 connecting a magnet holder 33 and the plurality of blades. Additionally, the aperture module 100 may include a position sensor (not illustrated) to accurately determine the position of the magnet holder 33 including the magnet 30a, thereby enabling closed-loop control. Additionally, the aperture module 100 may include a cover 100a that covers the plurality of blades 101, 102, and 103, the first base 21 and the second base 22, and may have a through-hole through which light is incident.

The plurality of blades may include a first blade 101 fixed to the first base 21, a second blade 102 and a third blade 103 that are shrunk inwardly or expand outwardly to change the size of the through-hole of the cover 100a.

The first blade 101 may include a through-hole through which light is incident, and may include a plurality of first receiving holes 101a. For example, referring to FIG. 6, the four first receiving holes 101a may be disposed at regular intervals in exterior areas of the first blade 101 in the circumferential direction of the through-hole, but the one or more examples are not limited thereto. The plurality of first receiving holes 101a may be fitted into the plurality of fixing protrusions 101b of the first base 21. For example, the plurality of fixing protrusions 101b may be accommodated in the plurality of first receiving holes 101a, and thus, the first blade 101 may be fixed to the first base 21. Additionally, the plurality of fixing protrusions 101b may be inserted into the receiving holes 102a and 103a of the second blade 102 and the third blade 103, and may operate as a drive shaft for the second blade 102 and the third blade 103. For example, when the first protrusion 104a moves while being inserted into the receiving holes 102b and 103b of the second blade 102 and the third blade 103, the fixing protrusion 101b may be inserted into the receiving holes 102a and 103a of the second blade 102 and the third blade 103, and may operate as a rotating shaft.

The second blade 102 and the third blade 103 may be provided in a substantially boomerang shape, as an example, and an inner side portion forming an entrance hole may be formed in a plurality of broken line shapes, as an example. The second blade 102 to the third blade 103 may be formed in pairs of the same shape, and blades of the same shape may be provided in the same position in the optical axis (Z-axis) direction while facing each other, for example, on the same layer. For example, the two blade shapes 102c and 102d that form the second blade 102 and the two blade shapes 103c and 103d that form the third blade 103 may be provided on the same layer, respectively.

In an example, the first base 21 may have a shape that is open in the direction of the optical axis (Z-axis), and may include a protrusion 21b that protrudes in a direction intersecting the optical axis (Z-axis). The protrusions 21b may be disposed in a 'L' shape at both ends of the first base 21. A first guide groove 21a may be formed in a portion of the protrusion 21b having a length in the direction of the optical axis (Z-axis).

The second base 22 may be connected to the first base 21. A guide portion 22a disposed on the second base 22 may be accommodated in the first guide groove 21a of the first base 21 to guide the movement of the first base 21 in the optical axis (Z-axis) direction.

The magnet holder 33, which accommodates the magnet 30a, may be accommodated in the second base 22, and may be supported by a plurality of first ball members 31, to be movable in a direction intersecting the optical axis (Z-axis) with respect to the second base 22. The first ball member 31 may be accommodated in the first ball guide portion 32 disposed on the second base 22 and the magnet holder 33, respectively, and may be moved in a direction intersecting, or perpendicular to the optical axis (Z axis).

The first base 21 moves relative to the second base 22 in the direction of the optical axis (Z-axis). In this example, the first base 21 may be coupled to an extension portion 213 of the guide member 201b, and the second base 22 may be disposed on one outer surface of the first lens holder 202a and be coupled to an inner locking jaw (not illustrated) of the housing. A base cover 35 may be disposed to cover a portion of the side surface of the protrusion 21b of the first base 21 and a portion of the upper surface of the second base 22, and may cover the portion where the first base 21 and the second base 22 are connected.

The first elastic member 34 may be disposed in a contracted state between the base cover 35 and the second base 22, and may be stretched when the first base 21 moves relative to the second base 22 in the direction of the optical axis (Z-axis). Since the example aperture module 100 includes the first elastic member 34, the position of the second base 22 in the optical axis (Z-axis) direction may be maintained even without fixing the second base 22 to the lens holder 202 with a bond or the like, and movement of the first base 21 in the optical axis (Z-axis) direction with respect to the second base 22 may be possible. At this time, the guide portion 22a disposed on the second base 22 may be accommodated in the first guide groove 21a disposed on the first base 21.

An aperture driver 30 includes the magnet 30a and the fourth coil 30b (FIG. 5). The magnet 30a may be disposed in the magnet holder 33 and the fourth coil 30b may be disposed in the housing 300 to be described later. In an example, the aperture driver 30 may move the magnet holder 33 with respect to the second base 22 in the direction intersecting the optical axis (Z-axis), by the interaction of an electromagnetic force between the magnet 30a and the fourth coil 30b. The magnet holder 33 includes a plurality of second protrusions 104b having a length in the direction of the optical axis (Z-axis), and is engaged with the third protrusions 104c of the rotator 104 to be described later.

The rotator 104 may include a plurality of first protrusions 104a having a length in the direction of the optical axis (Z-axis), and the plurality of blades 101, 102, and 103 may have a plurality of receiving holes 102b and 103b in which the plurality of first protrusions 104a are accommodated. The plurality of first protrusions 104a may be movable within the receiving holes 102b and 103b. For example, since the plurality of first protrusions 104a may be accommodated and moved in the receiving hole 102b of the second blade 102 and the receiving hole 103b of the third blade, the size of the entrance hole formed between the plurality of blades 102 and 103 may be changed.

The rotator 104 may be connected to the magnet holder 33 and the plurality of blades 101, 102, and 103, to convert the linear motion of the magnet holder 33 in the direction intersecting the optical axis (Z-axis) into the rotational motion of the plurality of blades 101, 102, and 103. The plurality of third protrusions 104c disposed on the rotator 104 may be engaged with the plurality of second protrusions 104b, and thus, the plurality of second protrusions 104b and the plurality of third protrusions 104c may move together in the direction intersecting the optical axis (Z-axis).

Figure 8:
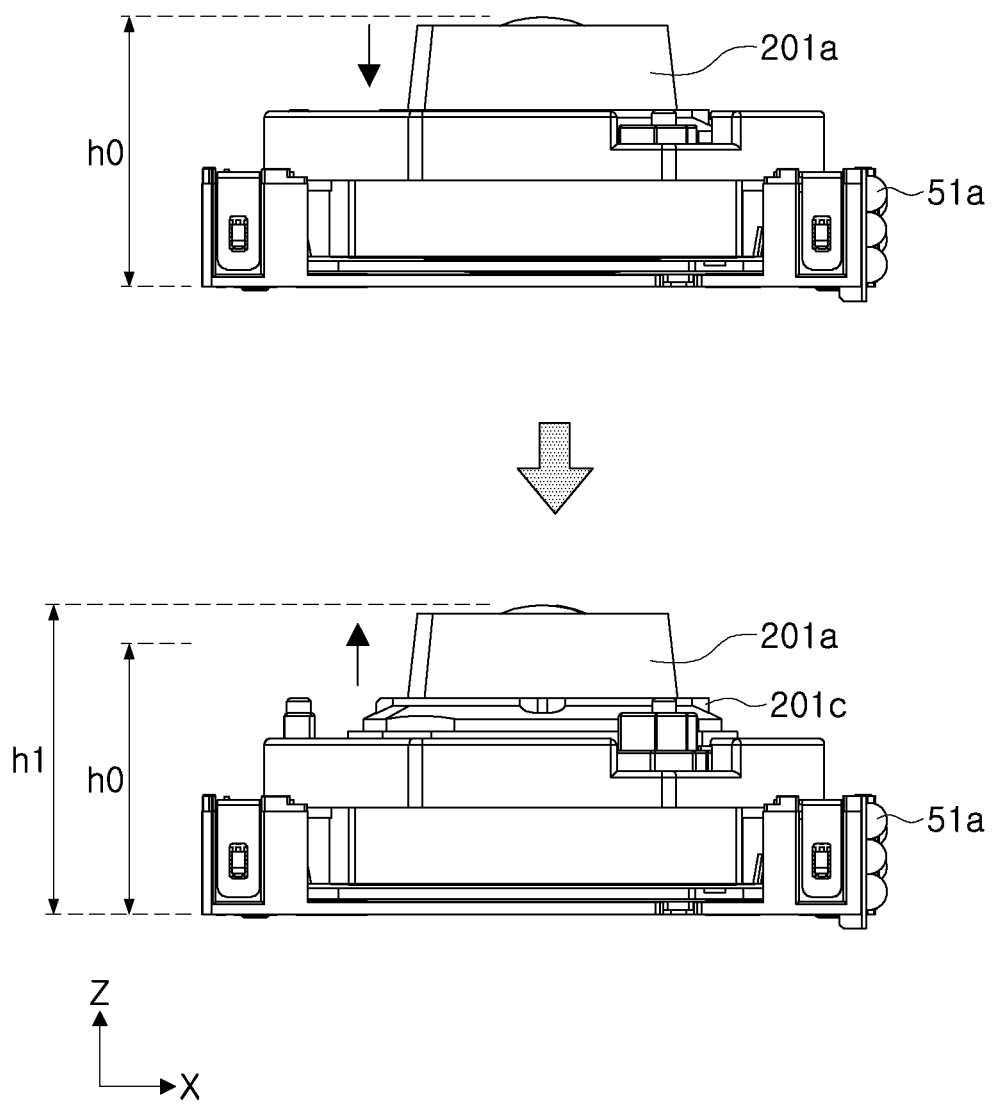
FIG. 8 is a side view of an example lens module in a pop-in state and a pop-out state as viewed in the X-Z direction, in accordance with one or more embodiments.
Figure 9:
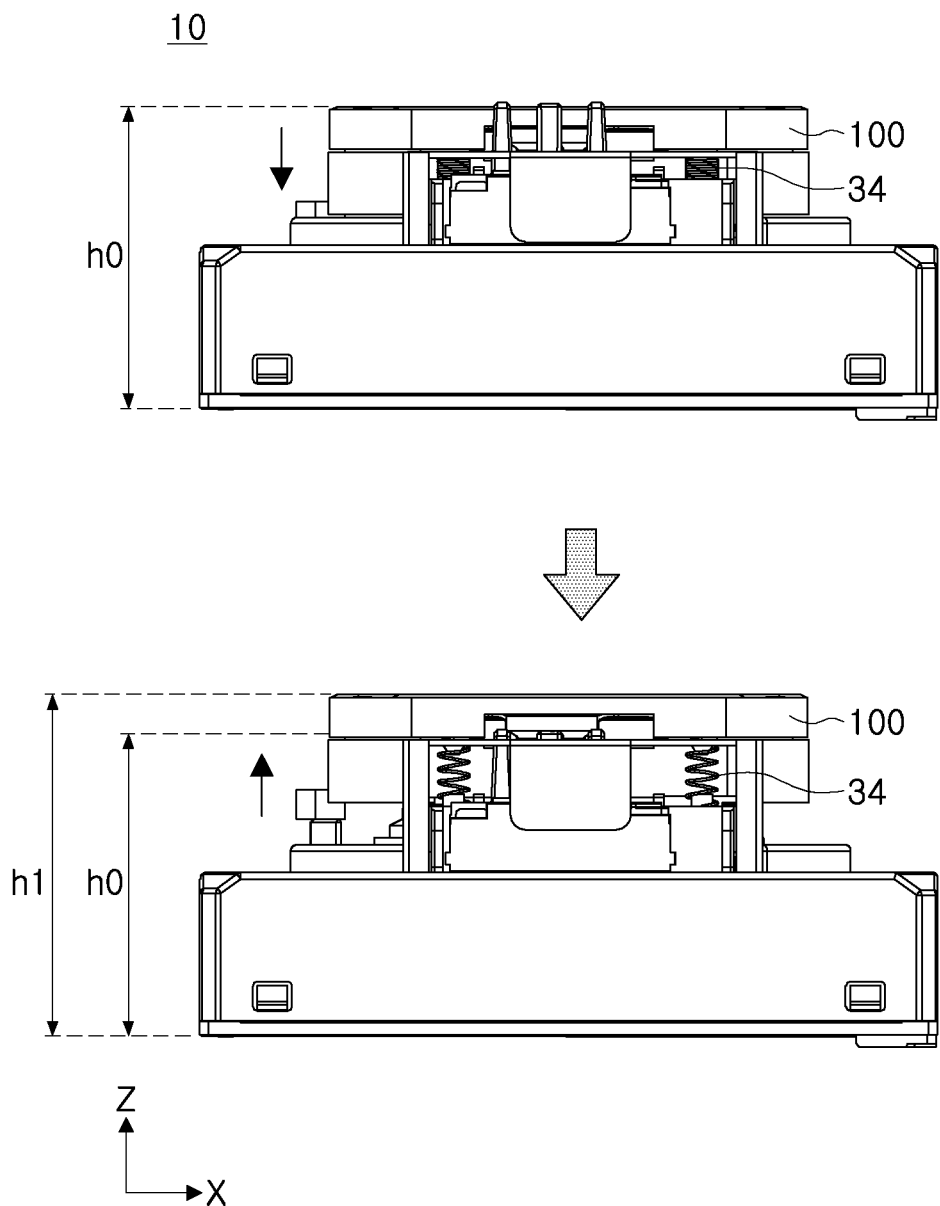
FIG. 9 is a side view of an example camera module in a pop-in state and a pop-out state, viewed in the X-Z direction, in accordance with one or more embodiments.

FIG. 8 is a side view of the lens module 200 in a pop-in state and a pop-out state viewed in the X-Z direction, in accordance with one or more embodiments, and FIG. 9 is a side view of the camera module 10 in a pop-in state and a pop-out state viewed in the X-Z direction, in accordance with one or more embodiments.

Referring to FIG. 8, the lens module 200 in a pop-in state in which power is not turned on is located at an initial height h0. In the example of a pop-out state in which the power is turned on, the lens module 200 is located at a position h1 which is higher in the optical axis (Z-axis) direction than the initial height h0. In an example, when the camera module 10 is not in use, the lens barrel 201 is moved downwardly or inwardly (in the direction toward the image sensor) in the optical axis (Z-axis) direction with respect to the lens holder 202, thereby significantly reducing the degree of protrusion of the lens barrel 201 outwardly of the camera module 10. When the camera module 10 is used, the lens barrel 201 may be moved upwardly or outwardly (a direction toward the subject) in the optical axis (Z-axis) direction with respect to the lens holder 202.

In an example, in recent camera modules, it may be difficult to reduce the size of the camera modules because various configurations for performance improvement are desires. Accordingly, there is a problem in that the camera module is mounted to protrude from the electronic device. However, the camera module 10, in accordance with one or more embodiments, changes the position of the lens module 200 depending on whether the camera module 10 is used, and accordingly, a problem in which the camera module 10 always protrudes from the portable electronic device may be prevented.

Referring to FIGS. 5 and 8, as described above, the lens barrel 201 includes a lens barrel 201a, a guide member 201b, and a first lens barrel holder 201c.

Referring to FIG. 5, the guide member 201b may be disposed between the lens barrel 201a and the first lens barrel holder 201c. A portion of the lens barrel 201a may be accommodated in the guide member 201b, and the lens barrel 201a and the guide member 201b may be accommodated in the first lens barrel holder 201c.

Referring to FIG. 5, the guide member 201b may move relative to the first lens holder 202a while being elastically supported by the second elastic member 210. The guide member 201b may move together with the lens barrel 201a, and the first lens barrel holder 201c may be fixed to the first lens holder 202a. Accordingly, the lens barrel 201a and the guide member 201b may move relative to the first lens barrel holder 201c and the first lens holder 202a in the direction of the optical axis (Z-axis), and a movement thereof in the optical axis (Z-axis) direction may be enabled by the elastic force of the second elastic member 210 connecting the lower surface of the guide member 201b and the first lens holder 202a.

The second elastic member 210 may be provided in a shape that provides an elastic force in the direction of the optical axis (Z-axis). In a non-limited example, three second elastic members 210 are provided, and although the three second elastic members 210 are spaced apart at 120° intervals, the scope of the example is not limited to the number of second elastic members 210.

On surfaces of the guide member 201b and the first lens holder 202a facing each other, coupling protrusions 210a and 210b may be disposed to protrude in the direction of the optical axis (Z-axis), respectively. For example, one end of the second elastic member 210 is coupled to the coupling protrusion 210a of the guide member 201b, and the other end of the second elastic member 210 may be coupled to the coupling protrusion 210b of the first lens holder 202a.

A guide structure may be provided between the guide member 201b and the first lens barrel holder 201c to allow the guide member 201b to move in parallel in the direction of the optical axis (Z-axis). A guide protrusion 211 may be disposed on one of the guide member 201b and the first lens barrel holder 201c, and a guide groove 212 may be disposed on the other of the guide member 201b and the first lens barrel holder 201c.

In an example, on the side of the guide member 201b, three guide protrusions 211 that protrude in a direction perpendicular to the optical axis (Z-axis) may be disposed at 120° intervals in the circumferential direction of the guide member 201b, and three guide grooves 212 may be disposed on the inner side surface of the first lens barrel holder 201c on the position facing the guide protrusion 211, at 120° intervals in the circumferential direction of the first lens barrel holder 201c. However, the number of guide protrusions 211 and the number of guide grooves 212 is not limited thereto. In this example, although it is described that the guide protrusion 211 is disposed on the guide member 201b and the guide groove 212 is disposed on the first lens barrel holder 201c, positions of the guide protrusion 211 and the guide groove 212 may be interchanged.

The guide groove 212 extends to have a length in the optical axis (Z-axis) direction. The number of guide protrusions 211 and guide grooves 212 correspond to each other. The guide protrusion 211 may be disposed in the guide groove 212, and may slide along the guide groove 212. In an example, a lubricant may be applied to the guide groove 212 to reduce friction with the guide protrusion 211 or to reduce heat.

In a non-limited example, each guide protrusion 211 may be configured to have a convex curved upper end, or may be configured in a semi-cylindrical shape having a length in a direction perpendicular to the optical axis (Z-axis). The upper end of the guide groove 212 may be configured to have a plurality of inclined surfaces (e.g., two). Therefore, when the lens barrel 201a is moved upwardly in the optical axis (Z-axis) direction in an operation of the camera module 1, the guide protrusion 211 may be located in an accurate position while being in point contact or line contact at at least two points in the direction of the optical axis (Z-axis) with respect to the guide groove 212.

The guide member 201b may include an extension portion 213 that extends in the direction of the optical axis (Z-axis) from a point at which the second elastic member 210 is coupled. For example, the thickness of the guide member 201b in the direction of the optical axis (Z-axis) at the position where the second elastic member 210 is coupled may be greater than the thickness of the other portion in the direction of the optical axis (Z-axis). Accordingly, the rigidity of the portion to which the elastic force is applied may be improved.

Additionally, the extension portion 213 of the guide member 201b may operate to receive a driving force in a downward direction in the optical axis (Z-axis) direction. For example, in a state in which the lens barrel 201a is moved in the direction of the optical axis (Z-axis), the extension portion 213 of the guide member 201b may protrude outwardly of the camera module 10, and when a driving force is applied to the extension portion 213 by a separate driving unit, the guide member 201b may move downwardly along with the lens barrel 201a in the direction of the optical axis (Z-axis).

Therefore, when the camera module 10 is not in use, the position of the lens barrel 201a may be moved downward in the optical axis (Z-axis) direction. In this state, the elastic force of the second elastic member 210 may be used to move the lens barrel 201a in the direction of the optical axis (Z-axis). For example, when the lens barrel 201a is positioned downward in the optical axis (Z-axis) direction, the second elastic member 210 is compressed to support the guide member 201b, and when the driving force applied to the extension portion 213 of the guide member 201b is removed, the guide member 201b and the lens barrel 201a may be moved together upwardly in the direction of the optical axis (Z-axis) by the elastic force of the second elastic member 210.

Hereinafter, with reference to FIGS. 6 and 9, a driving method of the aperture module 100 according to the pop-in state and pop-out state of the camera module 10, in accordance with one or more embodiments, will be described.

The lens module 200 in a pop-in state in which power is not turned on is located at an initial height h0. In the example of a pop-out state in which the power is turned on, the lens module 200 is located at a position h1 higher in the optical axis (Z-axis) direction than the initial height h0. At this time, the aperture module 100 located above the lens module 200 is also popped out.

Since the aperture module 100 performs an operation of adjusting the amount of light condensed by the lens module 200 and the image sensor, the aperture module 100 should maintain a constant distance (minimum gap) from the lens module 200. When the distance between the aperture module 100 and the lens module 200 changes, a problem may arise in the performance of the aperture module 100. For example, when the distance to the aperture module 100 changes as the height of the lens module 200 changes, an appropriate amount of light incident to the lens module 100 through the aperture of the aperture module 100 may change. Accordingly, as the height of the lens module 200 is changed, the aperture of the aperture module 100 should also be changed. If the aperture of the aperture module 100 is not changed even though the height of the lens module 200 is changed, the amount of light incident to the lens module 100 cannot be adjusted, and image quality degradation may occur due to light leakage.

In the aperture module 100 according to an example, the first base 21 on which the plurality of blades 101, 102, and 103 are disposed, and the second base 22 on which the aperture driver 30, that adjusts aperture sizes of the plurality of blades 101, 102, and 103 is disposed, are separated from each other. Therefore, when the lens module 200 protrudes in the direction of the optical axis (Z-axis), the distance between the plurality of blades 101, 102, and 103 that control the amount of light and the lens module 200 is kept constant. For example, as the height of the lens module 200 increases, the first base 21 located above the lens module 200 moves relative to the second base 22 in the direction of the optical axis (Z-axis).

Referring to FIGS. 8 and 9, the camera module 10 located at the top of FIG. 8 and the top of FIG. 9 is in a pop-in state. The lens module 200 is positioned at an initial height h0. At this time, a third protrusion 104c disposed on the rotator 104 is disposed at the lower end between the second protrusions 104b disposed on the magnet holder 33.

The camera module 10 located at the bottom of FIG. 8 and the bottom of FIG. 9 is in a pop-out state, and the lens module 200 is positioned at a pop-out height h1. The height of the second base 22 that accommodates the magnet holder 33 is the same height as the pop-in state, and the height may be fixed without change. At this time, the second base 22 is located on one outer surface of the first lens holder 202a. Additionally, the third protrusion 104c disposed on the rotator 104 is disposed on the upper end between the second protrusions 104b disposed on the magnet holder 33.

Referring to FIG. 6, the first elastic member 34 disposed between the second base 22 and the base cover 35 is contracted in a pop-in state, and then, the contracted first elastic member 34 is stretched or expanded in a pop-out state. Therefore, the first base 21 is moved in the direction of the optical axis (Z-axis), while the second base 22 maintains the original height thereof.

Figure 10:
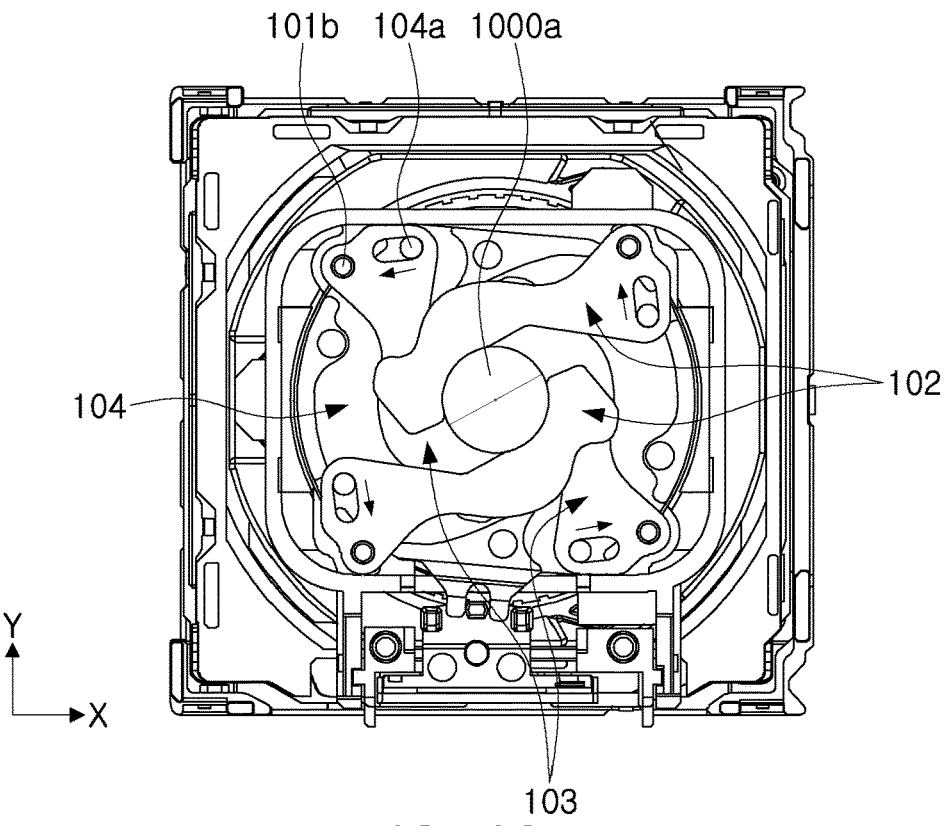
FIG. 10 is a plan view of an example aperture module having a small aperture, in accordance with one or more embodiments.
Figure 11:
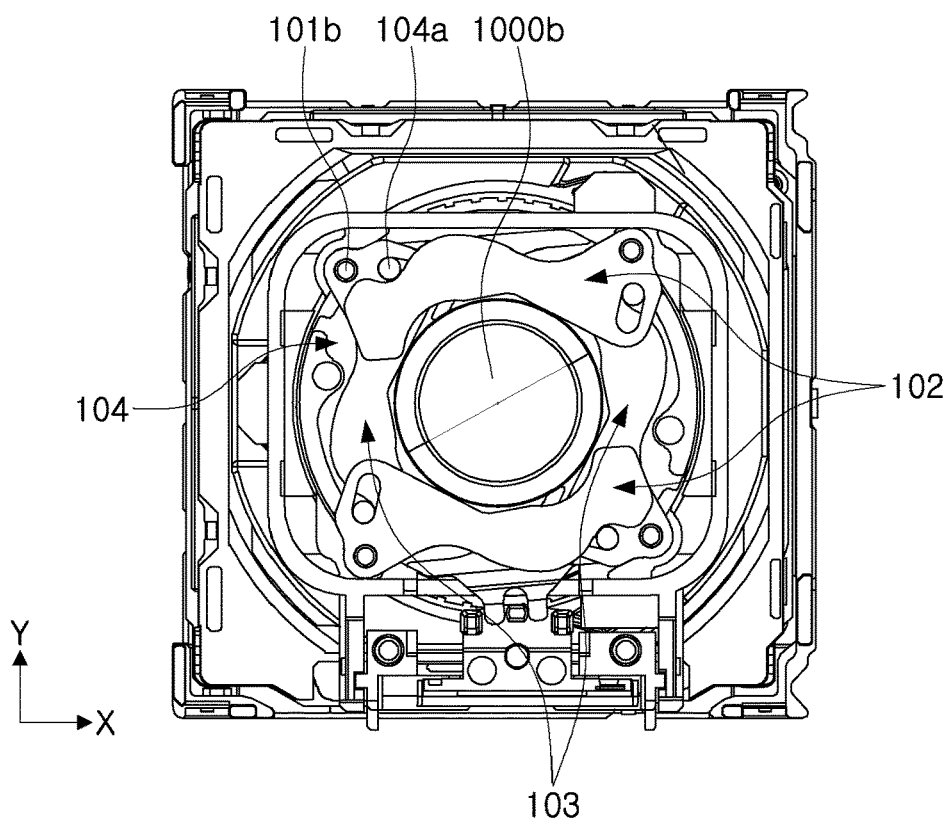
FIG. 11 is a plan view of an example aperture module having a large diameter, in accordance with one or more embodiments.

FIG. 10 is a plan view of an aperture module 100 having a small diameter according to an example, and FIG. 11 is a plan view of an aperture module 100 having a large diameter according to an example. FIGS. 10 and 11 are plan views of the aperture module 100 excluding the first blade 101 for convenience of explanation.

Hereinafter, a method of operating the plurality of blades 101, 102, and 103 according to the aperture driver 30 of the aperture module 100 will be described.

Referring to FIG. 10, when the magnet holder 33 is located on the end of one side of the second base 22, the smallest size of the entrance hole 1000a may be implemented by the second to third blades 102 and 103. Then, when the magnet holder 33 moves a certain distance from a first side end of the second base 22 to a second side end (when it moves to an approximately intermediate position), a medium-sized entrance hole (not illustrated) may be implemented by rotating the second to third blades 102 and 103.

Referring to FIG. 11, when the magnet holder 33 is moved to the second side end opposite to first side of the second base 22 by driving the aperture driver 30, the second to third blades 102 and 103 rotate to implement the largest entrance hole or through-hole 1000b.

As described above with reference to FIGS. 10 to 11, when the magnet holder 33 moves from a first side end to a second side end and then returns to first side end, the interaction between the second to third blades 102 and 103 may change the size of the entrance hole 1000a having the smallest size to the entrance hole 1000b having the largest size.

Additionally, when the magnet holder 33 is moved between a first side end and a second side end of the second base 22 by the driving of the aperture driver 30, an arbitrary entrance hole having a size between the largest entrance hole 1000b and the smallest entrance hole 1000a may be variously implemented by the second to third blades 102 and 103.

As described above, the aperture module 100 of the present example may continuously implement various sizes of entrance holes based on the rectilinear reciprocating motion of the magnet holder 33.

Figure 12:
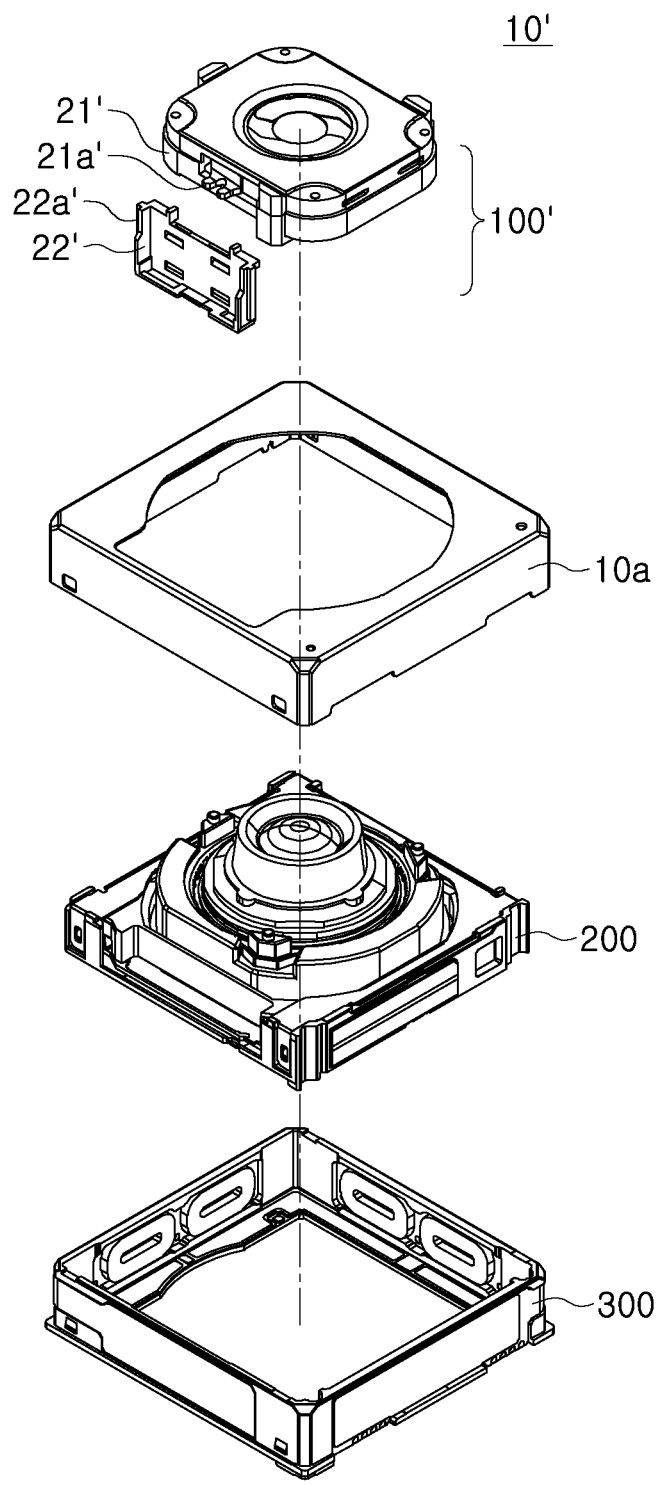
FIG. 12 is a partially exploded perspective view in which an example camera module, in accordance with one or more embodiments, is disassembled into a cover, an aperture module, a lens module, and a housing.
Figure 13:
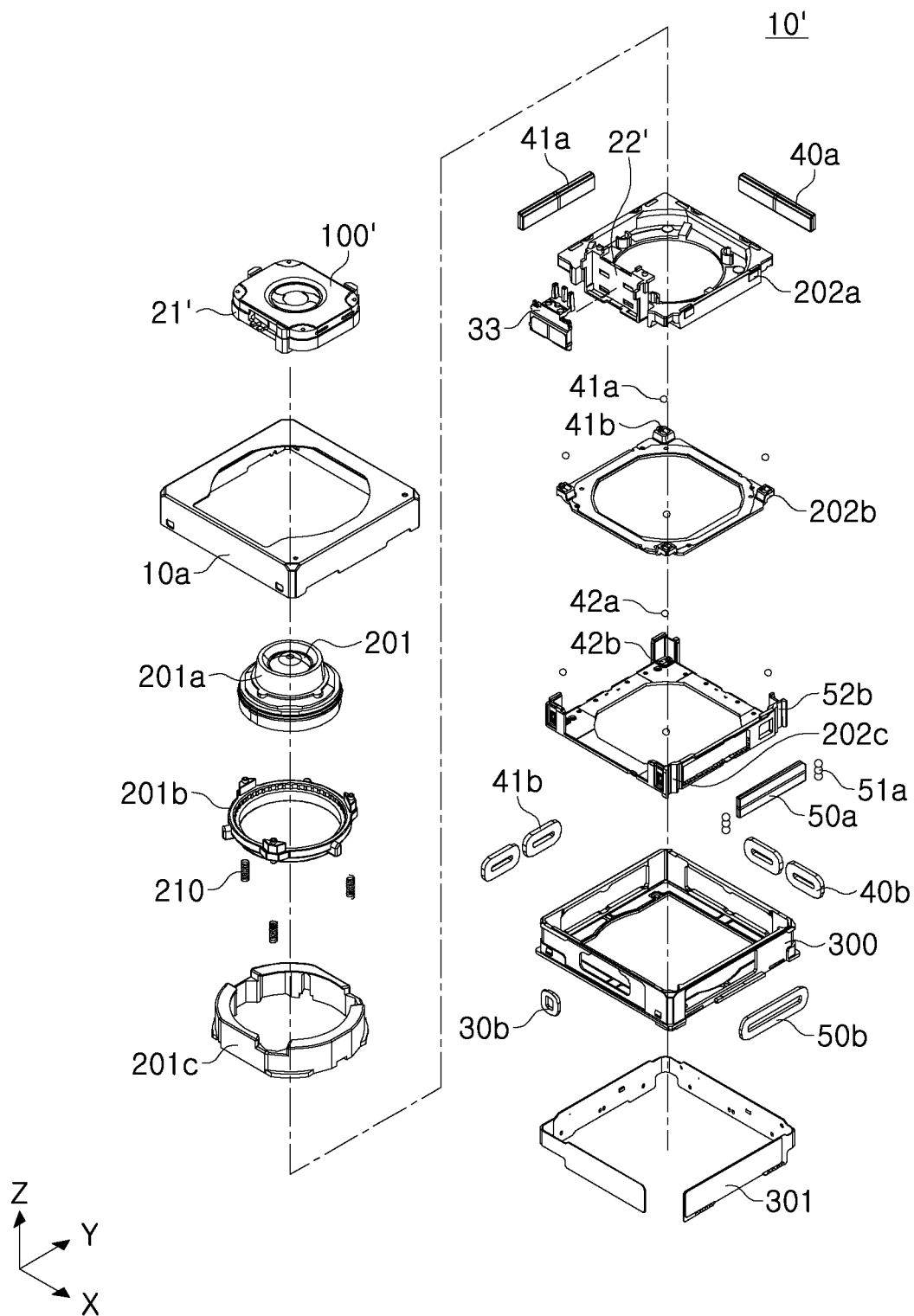
FIG. 13 is a schematic exploded perspective view of an example camera module, in accordance with one or more embodiments.

FIG. 12 is a partially exploded perspective view in which a camera module 10', in accordance with one or more embodiments, is disassembled into a cover 10a, an aperture module 100', a lens module 200, and a housing 300, and FIG. 13 is a schematic exploded perspective view of a camera module 10', in accordance with one or more embodiments.

Hereinafter, a camera module 10', in accordance with one or more embodiments, will be described. For reference, in the following description, the same reference numerals as those in the above-described example are used for components identical to those in the above-described example, and detailed descriptions of these components are omitted.

Referring to FIGS. 12 and 13, the camera module 10', in accordance with one or more embodiments, includes a cover 10a, an aperture module 100', a lens module 200, and a housing 300.

In an example, the aperture module 100' includes a plurality of blades 101, 102 and 103 (FIG. 6) that form a through-hole by interlocking with each other, a first base 21' on which the plurality of blades 101, 102 and 103 are disposed, a second base 22' connected to the first base 21', an aperture driver 30 (a magnet 30a and fourth coil 30b), and a rotator 104 (FIG. 6) that connect the magnet holder 33 and the plurality of blades 101, 102 and 103.

In an example, the first base 21' may have a shape that is open in the optical axis (Z-axis) direction, and a first guide groove 21a' may be formed in one side of the first base 21'.

The second base 22' may be connected to the first base 21'. A guide portion 22a' disposed on the second base 22' may be accommodated in the first guide groove 21a' of the first base 21', and may guide the movement of the first base 21' in the direction of the optical axis (Z-axis).

The second base 22' may be fixed to the first lens holder 202a. Therefore, in the camera module 10', in accordance with one or more embodiments, the first base 21' may be moved relative to the second base 22' without a separate elastic member or stopper configuration, while the second base 22' maintains the position thereof in the optical axis (Z-axis) direction.

Figure 14:
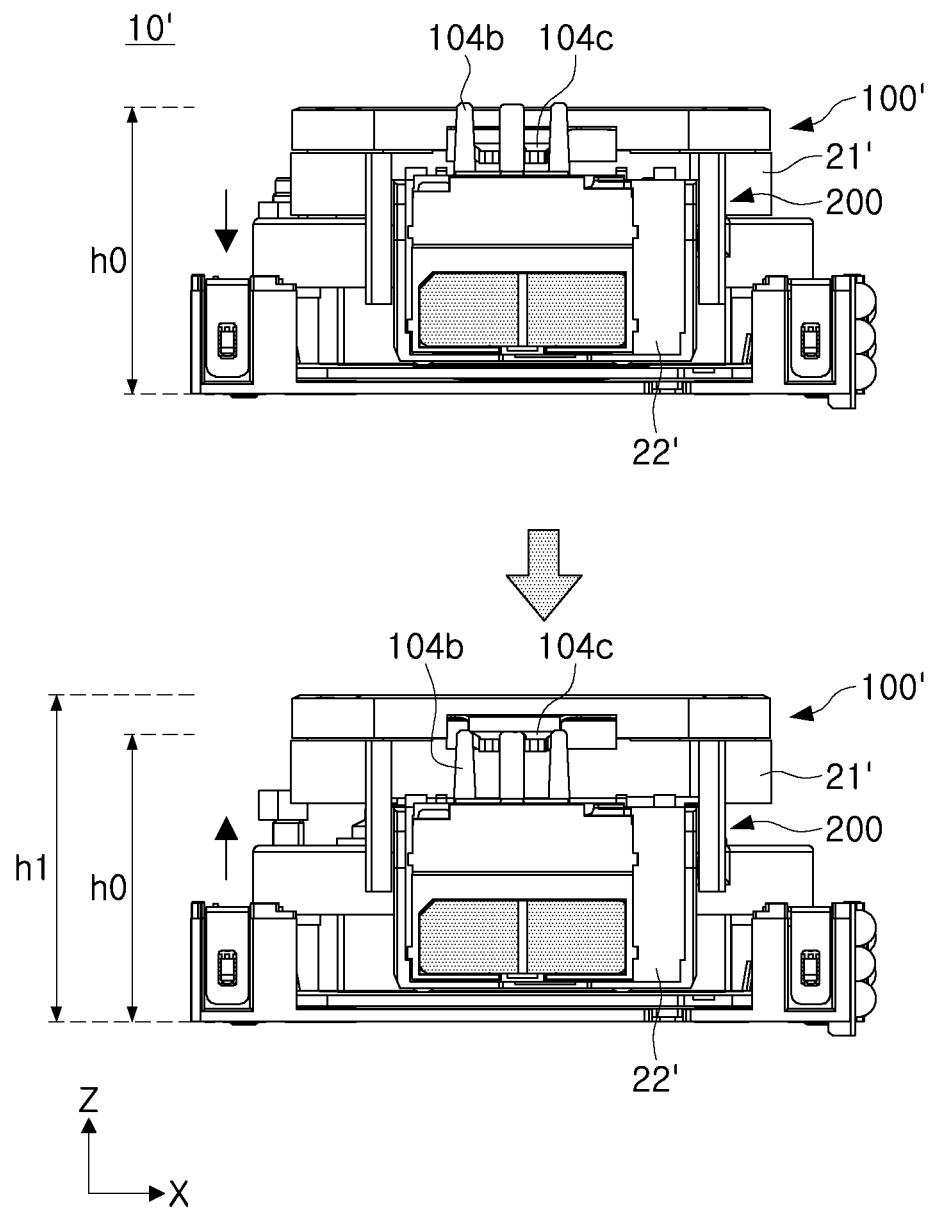
FIG. 14 is a side view of an example camera module in a pop-in state and a pop-out state, viewed in the X-Z direction, in accordance with one or more embodiments.

FIG. 14 is a side view of the example camera module 10' in a pop-in state and a pop-out state viewed in the X-Z direction, in accordance with one or more embodiments.

At the top of FIG. 14, the pop-in state of the camera module 10', in accordance with one or more embodiments, is illustrated. The lens module 200 is located at an initial height h0, and the third protrusion 104c disposed on the rotator 104 is disposed at the lower end between the second protrusions 104b disposed on the second base 22'.

At the bottom of FIG. 14, the pop-out state of the camera module 10' according to an example is illustrated. The lens module 200 is located at the pop-out height h1, and the first base 21' moves upwardly in the direction of the optical axis (Z-axis) with respect to the second base 22'. For example, the second base 22' may be in a fixed state, and the first base 21' moves in the direction of the optical axis (Z-axis). At this time, the third protrusion 104c disposed on the rotator 104 is disposed on the upper end between the second protrusions 104b disposed on the second base 22'.

As set forth above, an aperture module and a camera module including the aperture module, in accordance with one or more embodiments, may prevent deterioration in performance of the aperture module due to protrusion of the lens module.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An aperture module, comprising:
    a plurality of blades configured to interlock with each other to form a through-hole;
    a rotator on which the plurality of blades are disposed;
    a first base on which the rotator is disposed;
    a second base connected to the first base; and
    a driving unit disposed on the second base, and configured to provide a driving force to move the rotator in a direction that intersects an optical axis direction,
    wherein the first base is configured to move in the optical axis direction with respect to the second base.

2. The aperture module of claim 1, further comprising an elastic member disposed between the first base and the second base, and configured to have a length in the optical axis direction.

3. The aperture module of claim 1, further comprising a lens barrel configured to accommodate a plurality of lenses, and
    a lens holder configured to accommodate the lens barrel,
    wherein the second base is fixed to the lens holder.

4. The aperture module of claim 1, wherein the plurality of blades comprise:
    a first blade that is fixed to the first base; and
    a second blade and a third blade that are rotatably disposed with respect to the first base, and are configured to change a size of the through-hole.

5. The aperture module of claim 4, wherein the plurality of blades are driven based on an operation of a drive shaft that is disposed on the first base.

6. The aperture module of claim 1, wherein the rotator includes a plurality of first protrusions which each have a length in the optical axis direction, the plurality of blades include a receiving hole in which the plurality of first protrusions are accommodated, and the plurality of first protrusions are configured to move in the receiving hole of the plurality of blades.

7. The aperture module of claim 1, wherein the driving unit comprises a magnet holder in which a magnet is disposed,
    the magnet holder comprises a plurality of second protrusions having a length in the optical axis direction,
    the rotator comprises a plurality of third protrusions that are configured to engage with the plurality of second protrusions, and
    the plurality of second protrusions and the plurality of third protrusions are configured to move together in a direction that intersects the optical axis direction.

8. The aperture module of claim 1, wherein a first surface of the first base comprises a protrusion that protrudes in a direction that intersects the optical axis.

9. The aperture module of claim 1, wherein when the first base moves in the optical axis direction, the first base is configured to slide with respect to the second base, and
    a guide groove is disposed in one of a contact surface of the first base and a contact surface of the second base, and a guide protrusion is disposed in another of the contact surface of the first base and the contact surface of the second base.

10. The aperture module of claim 1, comprising:
a plurality of ball members disposed between the driving unit and the second base; and
a plurality of ball guide portions configured to accommodate the plurality of ball members,
wherein the plurality of ball members are configured to roll in a direction that intersects the optical axis direction.

11. A camera module, comprising:
a lens module including a plurality of lenses;
an aperture module disposed above the lens module; and
a housing configured to accommodate the lens module,
wherein the lens module comprises a lens barrel configured to accommodate a plurality of lenses, and a lens holder configured to accommodate the lens barrel, and
wherein the aperture module comprises:
a first base to which the lens module is coupled;
a plurality of blades disposed above the lens module, and configured to selectively form one of a plurality of holes having different diameters;
a rotator on which the plurality of blades are disposed, and coupled to the first base, and configured to move with respect to the first base;
a second base connected to the first base; and
a driving unit disposed on the second base, and configured to provide a driving force to move the rotator in a direction that intersects an optical axis direction, and
wherein the first base is configured to move in the optical axis direction with respect to the driving unit.

12. The camera module of claim 11, comprising:
a coil disposed in the housing; and
a connection board configured to supply power to the coil.

13. The camera module of claim 11, wherein the lens holder comprises:
a first lens holder configured to surround the lens barrel;
a second lens holder configured to surround the first lens holder; and
a third lens holder configured to surround the second lens holder, and
a plurality of elastic members disposed between the lens barrel and the first lens holder.

14. The camera module of claim 13, wherein the camera module comprises a shake correction unit disposed in the first lens holder, and configured to move the lens barrel in a direction that intersects the optical axis, with respect to the third lens holder.

15. The camera module of claim 14, wherein the shake correction unit comprises:
a first magnet and a second magnet disposed on the first lens holder; and
a first coil which faces the first magnet and a second coil which faces the second magnet,
wherein a direction of a driving force by the first magnet and the first coil, and a direction of a driving force by the second magnet and the second coil are perpendicular to each other.

16. The camera module of claim 13, wherein the camera module comprises a focus adjustment unit disposed on the third lens holder, and configured to move the lens holder in the optical axis direction with respect to the housing.

17. The camera module of claim 16, wherein the focus adjustment unit comprises a third magnet disposed on the third lens holder and a third coil disposed in the housing to face the third magnet.

18. A camera module, comprising:
an aperture module, comprising:
a first base;
a plurality of blades, disposed on the first base, and configured to form a through-hole in an optical axis direction;
a rotator, disposed on the base; and configured to connect the plurality of blades, and configured to control a rotational motion of the plurality of blades; and
a second base, connected to the first base, and configured to guide a movement of the first base in the optical axis direction in response to at least one of a pop-in state and a pop-out state of the camera module.

19. The camera module of claim 18, wherein the first base is configured to move in the optical axis direction relative to the second base.

20. The camera module of claim 18, wherein the pop-in state comprises a state in which power is off, and the pop-out state comprises a state in which power is on.

* * * * *